3,054,627
Patented Sept. 18, 1962

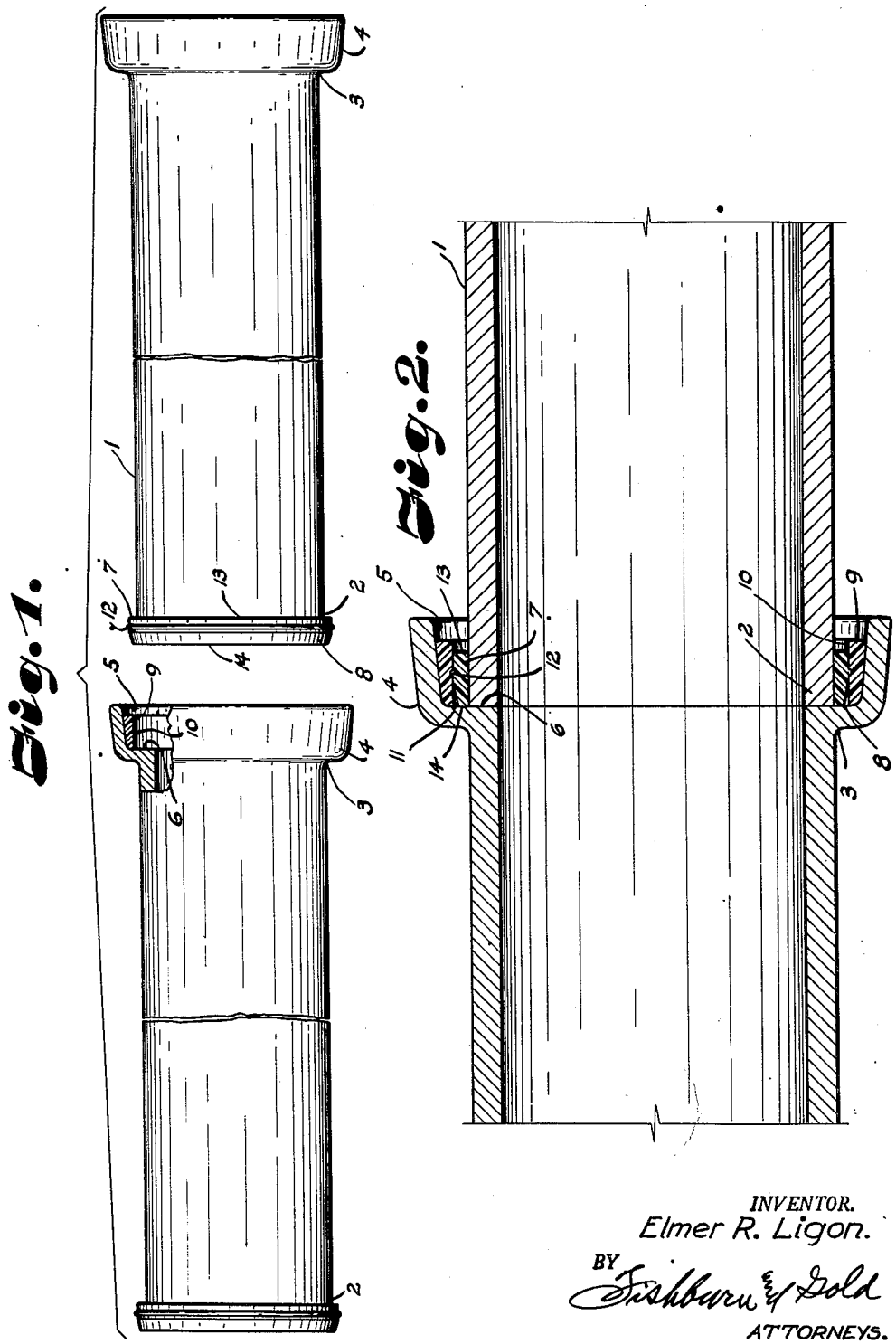

3,054,627
COUPLING FOR CERAMIC PIPE
Elmer R. Ligon, Pittsburg, Kans., assignor to W. S. Dickey Clay Manufacturing Company, Kansas City, Mo., a corporation of Delaware
Filed Oct. 26, 1959, Ser. No. 848,676
2 Claims. (Cl. 285—291)

This invention relates to improvements in compression gasketed joints for ceramic pipe, and more particularly to a coupling for ceramic pipe to accommodate for irregularities in the size or shape of the pipe to prevent leakage at the joint.

In the process of manufacturing of clay pipe, it has been found to be practically impossible to make a perfectly round bell and spigot end and of perfect dimensions. It has been found desirable to provide the bell and spigot ends of the ceramic pipe with a suitable synthetic resin material to act as gaskets on the pipe, one of such resinous materials being disclosed in Patent No. 2,779,056 of January 29, 1957, wherein is mentioned polyvinylchloride in dioctal phthalate with suitable filler such as silica flour, limestone and the like.

However, if the spigot diameter is larger than the socket internal diameter of the plastic ring by a definite amount, when the two are pushed together the interference will cause a flow of the plastic material resulting in a compression which will maintain a permanently tight sealed joint. Shear loading and other forces characteristic of trench conditions may cause forces to be applied differentially from one joint to another. If this occurs, the resilient gasket material is placed in compression on one side and compression is relieved on the opposite side. When sufficient force is applied, then there is enough compression relieved that leakage will occur.

Even with the method and apparatus as disclosed in Patent No. 2,779,056 with use of material such as polyvinylchloride, plastisols, polyurethane, epoxies and other resinous products, it has been found that certain interference is encountered. If these resinous materials are molded into the spigots and the sockets are made of such shape and dimension that they will not go into compression, then a compression joint will result which will seal tight and give desirable properties to jointed pipe-line which is in place in the ditch.

It is the principal object of the present invention to alleviate these difficulties by providing a resinous material on the spigot end of the pipe section with an annular bead or the like molded as an integral part of the spigot gasket which, when the two gaskets are placed in the pipe, shear load on the pipe will be deflected to an extent allowing greater movement between the pipes and still eliminate leakage therebetween.

Other objects of the present invention are to provide a joint of this character which will relieve the interference on the face of the gasket to eliminate breaking of the bell and of the pipe; to provide means on the spigot end of the pipe for exerting a small force against the socket or bell end over a narrow band which will increase the pressure per square inch resulting in a high pressure hydrostatic seal of the joints; to provide a joint of this character which provides greater deflection between the bell and spigot ends of the joint; to provide a high compression seal between the bell and spigot ends of the pipe and greater differential movement resulting in sealing against hydrostatic pressure; and to provide a device of this character wherein the annular or circumferential bead on the spigot end will remain tight and sealed against the bell end of the pipe, giving greater force of movement in the soil due to dimensional changes resulting in compression of the gasket material; and to provide a device of this character simple and economical to manufacture.

In accomplishing these and other objects of the present invention, I have provided improved details of structure, the preferred forms of which are illustrated in the accompanying drawings, wherein:

FIG. 1 is a disassembled partly cross-sectional view of two sections of pipe illustrating the bell and spigot ends thereof with the bead on the spigot end.

FIG. 2 is an enlarged cross-sectional view particularly illustrating the bell and spigot end in assembled position.

Referring more in detail to the drawings:

1 designates a tubular clay or ceramic pipe having end portions 2 and 3, the end portion 3 having an enlarged bell 4 forming an open socket 5 which may be slightly tapered in an inward direction and which terminates at its base in a flat annular shoulder or abutment 6. The end 2 is substantially straight and adapted to be projected into the bell or socket portion 4. A collar or band portion 7 of a synthetic resin or like material is arranged on the outer surface of the spigot end 2 and is preferably slightly tapered inwardly toward the open end of the pipe as indicated at 8.

The bell end portion 4 of the pipe is provided with a similar resinous material as indicated at 9 which outer wall conforms with the tapered wall of the bell, and the inner portion has a substantially straight inner wall, as indicated at 10, which leaves a slight space 11 between the resinous material at the mating ends of the pipe sections when in assembled relation. The synthetic resin is fused to the adjacent surfaces of the tile, and the tapered surface 8 on the spigot end allows for easy insertion in the line bell end of the tile and may be pushed together in a manner that the engaging surface of the synthetic resin will form a substantially tight joint.

The resinous material may be of various construction, but I have found that a polyvinylchloride plastisol, polyurethanes, epoxies and other resinous products are suitable for my purpose.

The resinous gasket material 7 on the spigot end 2 of the pipe is provided with a circumferential or annular bead 12 at substantially mid-way between the upper and lower ends 13 and 14 respectively of the resinous material and is relatively narrow in width and is molded as an integral part of the spigot gasket. I have found that the height of the bead compares favorably with the total interferences of the gaskets 7 and 9 so that when the two gaskets are placed in the pipe, greater shear load will be effected between the two resinous parts. By providing the narrow rim or bead on the gasket 7, a relatively small force will be exerted against the socket over a narrow band, resulting in greater pounds of pressure per square inch and a higher hydrostatic seal which results in less breaking of the bell portion of the pipe.

In laying the pipe in a continuous line, the spigot end 2 is inserted in the bell end 3 of the pipe and the spigot end with the resinous material and bead thereon forced into contact with the resinous portion 9 of the bell end so that the bead 7 will be pressed into the resinous material 9 on the bell end to effect a permanent seal in the joints between the two resinous materials. The tapered gasket material on the spigot end will allow for easy starting of insertion of the spigot end into the bell end.

It will be obvious from the foregoing that I have provided an improved coupling for ceramic pipe or the like wherein a complete seal of the joints of pipe together is accomplished and wherein shrinkage or increase of the clay pipe will not effect such seal. It will further be obvious that the bead on the spigot ends will cause a seal which will prevent extraneous matter, such as roots from trees and other projects, penetrating the joints of ceramic pipe.

What I claim and desire to secure by Letters Patent is:

1. Means for joining a bell end and a spigot end of adjoining pipe sections of ceramic material, a pair of annular sealing elements of deformable resilient synthetic resin material capable of sliding engagement and of automatic restoration to original shape upon removal of deformation effecting force, one being in the form of a collar adhered to the spigot end and the other in the form of a lining adhered to the bell end inner surface, said lining having a substantially cylindrical inner surface, said collar having a substantially cylindrical portion with an outer surface of a diameter substantially corresponding to the diameter of the inner surface of said lining, said spigot end collar cylindrical surface being positioned and engaged within the cylindrical surface of the bell end lining when the sections are in joint forming position to provide support to resist shear loading tending to produce relative lateral movement, and a narrow annular rib integral with and on one of said cylindrical surfaces and extending continuously circumferentially thereof, said rib having such spacing from ends of the engaged cylindrical surface portions that said rib in the cold flow thereof is confined within said engaged cylindrical surface portions, said rib having a radial height that is substantially the interference between the collar and lining and a width that is in the nature of the radial height of said rib whereby said rib provides a compression seal therebetween without excessive hoop stress in the bell end when the sections are joined by moving said spigot end into said bell end.

2. Means for joining a bell end and a spigot end of adjoining pipe sections as set forth in claim 1 wherein the lining and collar at the cylindrical portions are similar in thickness, the collar has an inwardly tapered end portion for facilitating insertion in the bell end, and the narrow annular rib is positioned substantially midway between ends of the cylindrical portions of the collar.

References Cited in the file of this patent

UNITED STATES PATENTS

| | | |
|---|---|---|
| 2,316,806 | Parker | Apr. 20, 1943 |
| 2,641,489 | Hedberg | June 9, 1953 |
| 2,770,476 | Cleverly | Nov. 13, 1956 |
| 2,955,322 | Hite | Oct. 11, 1960 |

FOREIGN PATENTS

| | | |
|---|---|---|
| 4,213 | Great Britain | Mar. 18, 1890 |
| 57,438 | France | Nov. 5, 1952 |
| 217,685 | Australia | Apr. 18, 1957 |